US008057881B2

(12) United States Patent
Fay et al.

(10) Patent No.: US 8,057,881 B2
(45) Date of Patent: *Nov. 15, 2011

(54) FUNGI RESISTANT ASPHALT AND ASPHALT SHEET MATERIALS

(75) Inventors: Ralph Michael Fay, Lakewood, CO (US); Angela R. Bratsch, Monument, CO (US); Blake Boyd Bogrett, Littleton, CO (US); Anthony E. Moore, Glen Allen, VA (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/581,853

(22) Filed: Oct. 17, 2006

(65) Prior Publication Data
US 2007/0298218 A1 Dec. 27, 2007

Related U.S. Application Data

(63) Continuation of application No. 10/801,733, filed on Mar. 15, 2004, now abandoned, which is a continuation-in-part of application No. 10/703,130, filed on Nov. 6, 2003, now abandoned, which is a continuation-in-part of application No. 10/465,311, filed on Jun. 19, 2003, now abandoned, which is a continuation of application No. 10/394,134, filed on Mar. 20, 2003, now abandoned.

(51) Int. Cl.
*D06N 7/04* (2006.01)
*D06N 5/00* (2006.01)
*B32B 3/06* (2006.01)
*B32B 27/36* (2006.01)
*B32B 27/06* (2006.01)
*B32B 11/00* (2006.01)
*D04H 3/16* (2006.01)

(52) U.S. Cl. ............... 428/141; 428/306.6; 428/412; 428/480; 428/489; 442/401

(58) Field of Classification Search .......... 428/36.9, 428/68, 71, 74, 43, 126, 167, 907; 424/412–415, 424/611, 703; 162/161; 52/98, 406.2, 407.3, 52/407.4, 404.1, 408; 106/18.34, 668, 671, 106/274, 277
See application file for complete search history.

(56) References Cited

U.S. PATENT DOCUMENTS

| | | | |
|---|---|---|---|
| 2,280,460 A | 4/1942 | Voigt et al. | |
| 2,330,810 A * | 10/1943 | Crandell | 428/332 |
| 2,395,922 A | 3/1946 | Timmons | |
| 2,496,566 A | 2/1950 | Szwarc | |
| 2,568,849 A | 9/1951 | George et al. | |
| 2,568,850 A | 9/1951 | George et al. | |
| 2,786,004 A | 3/1957 | Schwartz | |
| 2,913,104 A | 10/1957 | Parker | |
| 2,887,426 A * | 5/1959 | Knold | 428/490 |
| 3,140,220 A | 7/1964 | Walter | |
| 3,222,243 A | 12/1965 | Gaston et al. | |
| 3,307,306 A | 3/1967 | Oliver | |
| 3,370,957 A | 2/1968 | Wagner et al. | |
| 3,729,879 A | 5/1973 | Franklin | |
| 3,842,559 A * | 10/1974 | Payne | 52/309.12 |
| 3,998,944 A | 12/1976 | Long | |
| 4,282,276 A | 8/1981 | Smith | |
| 4,629,645 A | 12/1986 | Inoue | |
| 4,709,523 A | 12/1987 | Broderick et al. | |
| 4,952,441 A | 8/1990 | Bose | |
| 5,192,598 A | 3/1993 | Forte et al. | |
| 5,236,754 A | 8/1993 | McBride et al. | |
| 5,253,461 A | 10/1993 | Janoski et al. | |
| 5,264,257 A | 11/1993 | Martinez et al. | |
| 5,271,767 A | 12/1993 | Light, Sr. et al. | |
| 5,277,955 A | 1/1994 | Schelhorn et al. | |
| 5,356,664 A | 10/1994 | Narayan et al. | |
| 5,362,539 A | 11/1994 | Hall et al. | |
| 5,506,020 A | 4/1996 | Haberkorn | |
| 5,554,238 A | 9/1996 | English | |
| 5,573,810 A | 11/1996 | Grubka | |
| 5,598,677 A | 2/1997 | Rehm, III | |
| 5,709,870 A | 1/1998 | Yoshimura et al. | |
| 5,733,624 A | 3/1998 | Syme et al. | |
| 5,746,854 A | 5/1998 | Romes et al. | |
| 5,773,375 A | 6/1998 | Swan et al. | |
| 5,848,509 A | 12/1998 | Knapp et al. | |
| 5,882,731 A | 3/1999 | Owens | |
| 5,931,157 A | 8/1999 | Aschauer | |

(Continued)

FOREIGN PATENT DOCUMENTS
EP 0 940 249 A2 8/1999
(Continued)

OTHER PUBLICATIONS

"KIMMCO Glass Duct", www.alghanim.com/contentdisp.asp?pageId=486, pp. 1-4, 2006.
"KIMMCO Alu Duct", www.alghanim.com/contentdisp.asp?pageId=524, pp. 1-8, 2006.
"KIMMCO Technical Information", www.alghanim.com/contentdisp.asp?pageId=490, pp. 1-8, 2006.
"KIMMCO FAQ", www.alghanim.com/contentdisp.asp?pageId=780, pp. 1-5, 2006.
"EERE Consumer's Guide:Moisture Control in Walls", www.eere.energy.gov/consumer/your_home/insulation_airsealing/index.cfm.mytopic=11800, Sep. 19, 2005.

*Primary Examiner* — David Sample
*Assistant Examiner* — Nathan Van Sell
(74) *Attorney, Agent, or Firm* — Robert D. Touslee

(57) ABSTRACT

A fungi resistant asphalt is combined with a base sheet to form a fungi resistant asphalt containing sheet material. Typically, the base sheet is a fibrous base sheet that, by itself, may or may not be fungi resistant. The fungi resistant asphalt is at least partially absorbed by the base sheet to form the fungi resistant asphalt containing sheet material and typically forms one or both major surfaces of the fungi resistant asphalt containing sheet material.

14 Claims, 1 Drawing Sheet

U.S. PATENT DOCUMENTS

| | | | |
|---|---|---|---|
| 6,083,594 A | 7/2000 | Weinstein et al. |
| 6,123,795 A | 9/2000 | Symons |
| 6,191,057 B1 | 2/2001 | Patel et al. |
| 6,231,927 B1 | 5/2001 | Ruid |
| 6,309,456 B1 | 10/2001 | Anthony |
| 6,331,350 B1 | 12/2001 | Taylor et al. |
| 6,357,504 B1 | 3/2002 | Patel et al. |
| 6,358,599 B1 | 3/2002 | Deibel et al. |
| 6,461,421 B1 | 10/2002 | Ronvak |
| 6,550,212 B2 | 4/2003 | Lubker, II |
| 6,808,772 B2 | 10/2004 | Kunzel et al. |
| 6,878,455 B2 | 4/2005 | Kunzel et al. |
| 6,890,666 B2 | 5/2005 | Kunzel et al. |
| 6,939,442 B2 | 9/2005 | Klimpl et al. |
| 7,008,890 B1 | 3/2006 | Kunzel et al. |
| 2001/0009834 A1 | 7/2001 | Peng et al. |
| 2001/0021711 A1 | 9/2001 | Beilfuss et al. |
| 2001/0030018 A1 | 10/2001 | Weinstein et al. |
| 2003/0054717 A1 | 3/2003 | Ahluwalia |
| 2003/0100604 A1 | 5/2003 | Fischer et al. |
| 2003/0129899 A1 | 7/2003 | Fields |
| 2004/0014385 A1 | 1/2004 | Greaves et al. |
| 2004/0023588 A1 | 2/2004 | Klein |
| 2004/0088939 A1 | 5/2004 | Fay et al. |
| 2004/0163724 A1 | 8/2004 | Trabbold et al. |
| 2004/0166087 A1 | 8/2004 | Gembala |
| 2005/0089653 A1 | 4/2005 | Shoshany et al. |
| 2005/0170721 A1 | 8/2005 | Toas et al. |
| 2005/0223668 A1 | 10/2005 | Thompson et al. |
| 2006/0008496 A1 | 1/2006 | Kulkurni et al. |

FOREIGN PATENT DOCUMENTS

| | | |
|---|---|---|
| JP | 354155265 A | 12/1979 |
| JP | 57-032508 A | 2/1982 |
| WO | WO 0172125 A2 | 10/2001 |
| WO | WO 02/22976 A1 | 3/2002 |

* cited by examiner

FUNGI RESISTANT ASPHALT AND ASPHALT SHEET MATERIALS

This patent application is a continuation of patent application Ser. No. 10/801,733 filed Mar. 15, 2004, now abandoned which is a continuation-in-part of patent application Ser. No. 10/703,130 filed Nov. 6, 2003, now abandoned which is a continuation-in-part of patent application Ser. No. 10/465,311 filed Jun. 19, 2003, now abandoned which is a continuation of patent application Ser. No. 10/394,134 filed Mar. 20, 2003.

BACKGROUND OF THE INVENTION

The subject invention relates to fungi resistant asphalt and to products including the fungi resistant asphalt when the fungi resistant asphalt is combined with a base sheet to form a fungi resistant sheet material. The fungi resistant sheet material of the subject invention is especially useful for roll goods and sheet materials that are used in roofing applications and residential and commercial construction applications.

Several fungi resistant asphalt containing products, such as roofing shingles, are commercially available where the products are made fungi resistant through the use of topping granules that contain or are coated with a metal or metal salt based on copper, zinc, or silver. However, to Applicant's knowledge, none of these products is made fungi resistant by adding an antimicrobial or biocide (a fungi growth-inhibiting agent) to the asphalt. While these granule topped products perform satisfactorily, it would be beneficial to have asphalt containing sheet products that are fungi growth resistant without the need to incorporate topping granules into the product provided these other asphalt containing sheet products could be economically and efficiently produced without adversely affecting the performance of such products. By way of example, the following are a few of the asphalt containing sheet material products in the building industry that are currently made with asphalt that is not fungi resistant and that have applications where it would be beneficial for the products to be fungi resistant.

Tarpaper is commonly used in the building industry as an underlayment in residential and commercial roofing applications and as a low cost but very effective housewrap under exterior siding, brick, or stucco. Typically, tarpaper is an organic paper-like felt that is coated and saturated with asphalt by spaying both major surfaces of the felt with asphalt or dip coating the felt with asphalt. Most felts used in tarpaper are formed primarily of cellulose fibers but some felts include mixtures of cellulose fibers and reinforcing fibers to make the felt stronger (examples of organic felts are disclosed in United States Patent Application Publication Pub. No: US 2003/0129899 published on Jul. 10, 2003). Other similar asphalt saturated sheet materials and most of the generic asphalt building papers often referred to as Grade D building paper could also benefit by being fungi resistant. Added fungi growth resistance should also be beneficial for other roofing materials made of asphalt coated nonwovens, such as but not limited to glass mats, polyester mats, and polyester spunbonds. Single-side asphalt coated sheet materials where the base sheet, by itself, is naturally fungi resistant, but the asphalt coated sheet material is not, should also benefit if made with fungi resistant asphalt. For example, a single-side coated polyester that was fungi resistant could be used as a high quality/high strength roofing underlayment for clay and concrete tiles, as a canal liner, as a low-cost housewrap, as a packaging material for lumber, and for other uses. Similar breathable, hot melt coated, nonwoven sheet materials that could benefit by being fungi resistant are disclosed in United States Patent Application Publication Pub. No: US 2004/0023588 published Feb. 5, 2004. For certain applications, it should also be beneficial to have asphalt saturated fiberboard that is fungi resistant.

SUMMARY OF THE INVENTION

The fungi resistant asphalt of the subject invention and the combination of the fungi resistant asphalt of the subject invention with various base sheets to form asphalt containing sheet materials that are fungi resistant provides an economical, easy to implement, and effective solution to the need to provide asphalt containing sheet materials that are fungi resistant, preferably fungi growth resistant (as hereinafter defined) and more preferably fungi growth resistant with no observable fungi growth (as hereinafter defined). One or both major surfaces of the asphalt containing sheet materials of the subject invention are or contain the fungi resistant asphalt of the subject invention and many of the base sheets in the asphalt containing sheet materials of the subject invention are saturated with the fungi resistant asphalt of the subject invention.

As used herein the term "asphalt" includes both asphalt and modified asphalt, such as but not limited to one of the modified asphalts commonly used in the industry to make tarpaper, asphalt saturated roofing felts, asphalt building papers, and to bond facings to insulation layers. The asphalt of the asphalt containing sheet material of the subject invention may be applied to the major surface or surfaces of the base sheet by various methods, such as but not limited to, applying the asphalt to one or both major surfaces of the base sheet with slot die extrusion coaters; applying the asphalt to one or both major surfaces of the base sheet with transfer rolls; applying the asphalt to both major surfaces of the base sheet by dipping the base sheet into the asphalt, and applying the asphalt to one or both major surfaces of the base sheet by conventional spray on techniques. The base sheet of the asphalt sheet material of the subject invention is able to withstand the temperatures required to apply and typically saturate the base sheet with the fungi resistant asphalt with little or no degradation or shrinkage of the base sheet. The asphalt of the asphalt containing sheet material of the subject invention will typically increase the water repellency of the base sheet and thereby make the base sheet less susceptible to fungi growth by reducing the presence of moisture in the base sheet. In addition, the fungi resistant asphalt of the asphalt containing sheet of the subject invention can function as a vapor transmission retarder to reduce the passage of water vapor through the sheet material of the subject invention or as an air transmission retarder to reduce the passage of air through the sheet material of the subject invention.

DESCRIPTION OF THE PREFERRED EMBODIMENTS

Figure 1:
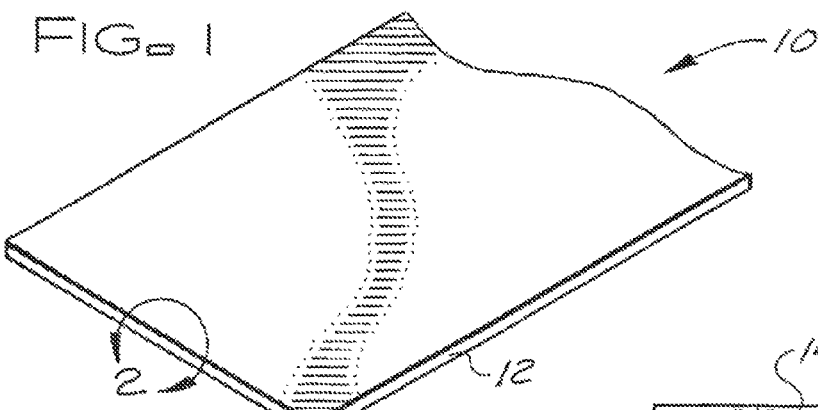
FIG. 1 is a partial schematic perspective view of a first asphalt containing sheet material of the subject invention.
Figure 2:
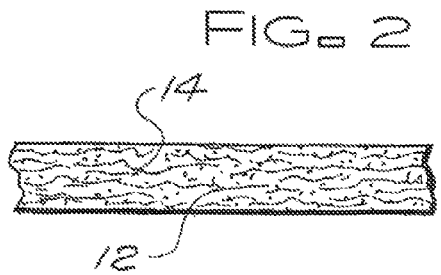
FIG. 2 is a partial schematic section through the thickness of the asphalt containing sheet material of FIG. 1 on a larger scale than the scale of FIG. 1.

FIGS. 1 and 2 show a first fungi resistant asphalt containing sheet material 10 of the subject invention that includes a fibrous base sheet 12 and a fungi resistant asphalt 14 of the subject invention. The fibrous base sheet 12 has a first major surface and a second major surface that are each defined by the length and width of the base sheet. The fibrous base sheet 12 is saturated with the fungi resistant asphalt and the asphalt saturated first and second major surfaces of the fibrous base sheet 12 form the first and second major surfaces of the fungi resistant asphalt containing sheet material 10. By itself, the fibrous base sheet 12 of the asphalt containing sheet material 10 may not be fungi resistant or may be fungi resistant and not readily support fungi growth. However, where the fibrous base sheet 12, by itself, is not fungi resistant, the fungi resistant asphalt 14 imparts fungi growth resistance to the fibrous base sheet 12 so that the asphalt containing sheet material 10 is more fungi resistant than the fibrous base sheet 12. Where the fibrous base sheet 12, by itself, is fungi resistant, the fungi resistant asphalt 14 with the fungi resistant base sheet 12, unlike asphalt containing sheet materials of the prior art that use asphalts that are not fungi resistant, forms a fungi resistant asphalt containing sheet material.

Figure 3:
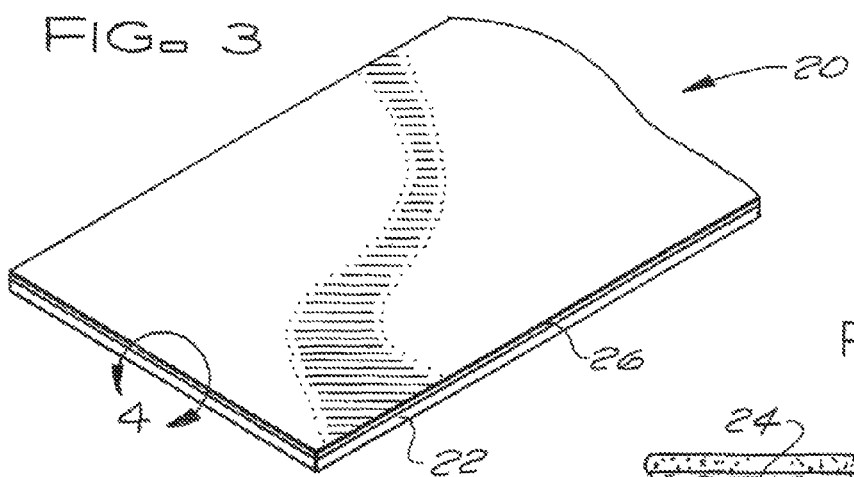
FIG. 3 is a partial schematic perspective view of a second asphalt containing sheet material of the subject invention.
Figure 4:
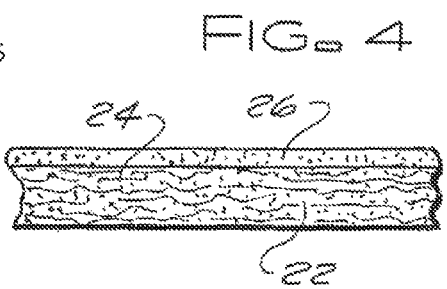
FIG. 4 is a partial schematic section through the thickness of the asphalt containing sheet material of FIG. 3 on a larger scale than the scale of FIG. 3.

FIGS. 3 and 4 show a second fungi resistant asphalt containing sheet material 20 of the subject invention that includes a fibrous base sheet 22 and a fungi resistant asphalt 24 of the subject invention. The fibrous base sheet 22 has a first major surface and a second major surface that are each defined by the length and width of the base sheet. The fungi resistant asphalt 24 forms a layer 26 on the first major surface of the fibrous base sheet 22 that, preferably, is coextensive with the first major surface of the fibrous base sheet. The fungi resistant asphalt layer 26 is partially absorbed into the fibrous base sheet 22. By itself, the fibrous base sheet 22 of the asphalt containing sheet material 20 may not be fungi resistant or may be fungi resistant and not readily support fungi growth. However, where the fibrous base sheet 22, by itself, is not fungi resistant, the fungi resistant asphalt 24 imparts greater fungi growth resistance to the fibrous base sheet 22 so that the asphalt containing sheet material 20 is more fungi resistant than the fibrous base sheet 22. For certain applications the fungi resistant asphalt 24 of the fungi resistant asphalt layer 26 is absorbed into the fibrous base sheet with little or no bleed through of the asphalt to the second major surface of the fibrous base sheet 22 so that the fungi resistant asphalt containing sheet material 20 is fungi resistant with an essentially asphalt free second major surface. With this structure the fungi resistant asphalt layer 26 forms the first major surface of the fungi resistant asphalt containing sheet material 20 and the second major surface of the fibrous base sheet 22 forms the second major surface of the fungi resistant asphalt containing sheet material 20. For certain other applications, the fibrous base sheet 22 is saturated with the fungi resistant asphalt 24 absorbed from the fungi resistant asphalt layer 26.

Figure 5:
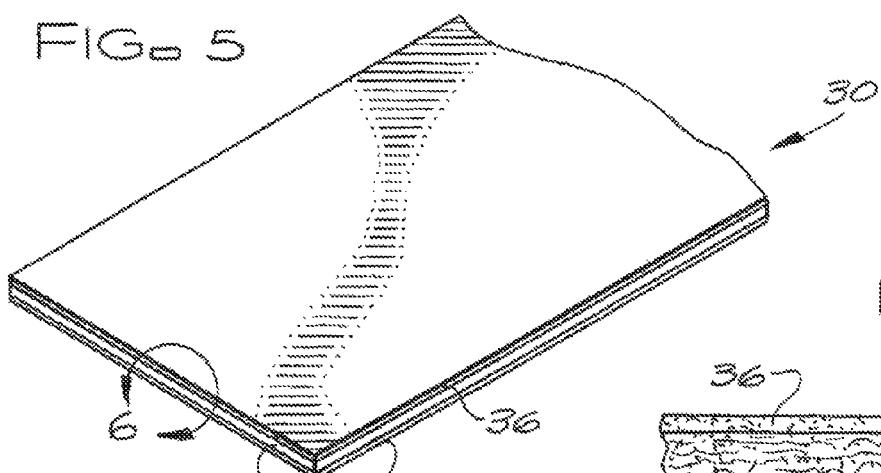
FIG. 5 is a partial schematic perspective view of a third asphalt containing sheet material of the subject invention.
Figure 6:
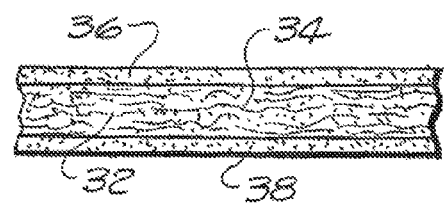
FIG. 6 is a partial schematic section through the thickness of the asphalt containing sheet material of FIG. 5 on a larger scale than the scale of FIG. 5.

FIGS. 5 and 6 show a third fungi resistant asphalt containing sheet material 30 of the subject invention that includes a fibrous base sheet 32 and a fungi resistant asphalt 34 of the subject invention. The fibrous base sheet 32 has a first major surface and a second major surface that are each defined by the length and width of the base sheet. The fungi resistant asphalt 34 forms a first layer 36 on the first major surface of the fibrous base sheet 32 and a second layer 38 on the second major surface of the fibrous base sheet 32. Preferably, these asphalt layers are coextensive with the first and second major surfaces of the fibrous base sheet 32. The fungi resistant asphalt 34 of the fungi resistant asphalt layers 36 and 38 is partially absorbed into the fibrous base sheet 32. By itself, the fibrous base sheet 32 of the asphalt containing sheet material 30 may not be fungi resistant or may be fungi resistant and not readily support fungi growth. However, where the fibrous base sheet 32, by itself, is not fungi resistant, the fungi resistant asphalt 34 imparts greater fungi growth resistance to the fibrous base sheet 32 so that the asphalt containing sheet material 30 is more fungi resistant than the fibrous base sheet 32. For certain applications, the fibrous base sheet 32 is saturated with the fungi resistant asphalt absorbed from the fungi resistant asphalt layers 36 and 38. With this structure the asphalt layers 36 and 38 form the first and second major surfaces of the fungi resistant asphalt containing sheet material 30 and the fibrous base sheet 32 forms an intermediate layer of the fungi resistant asphalt containing sheet material 30.

The fibrous base sheets 12, 22, and 32 may be a woven or nonwoven mat or scrim made with continuous or short staple fibers. The fibrous base sheet, by itself, may support fungi growth and may not be fungi growth resistant, as defined herein. Examples of fibrous base sheets that typically support fungi growth are base sheets made with organic fibers such as but not limited to cellulose and other natural fibers. Examples of fibrous base sheets that typically are fungi resistant and do not readily support fungi growth are fibrous base sheets made with inorganic fibers such as but not limited to glass fibers, ceramic fibers, and rock wool fibers and other fibers such as but not limited to polyester fibers, nylon fibers, polypropylene fibers, and polyethylene fibers. Preferably, the fibers of the fibrous base sheet are able to withstand the temperatures required to effectively partially saturate or saturate the fibrous base sheet with the fungi resistant asphalt of the subject invention with little or no degradation or shrinkage of the fibrous base sheet (without significant degradation of the fibrous base sheet). In addition, to fibrous base sheets made of woven or nonwoven mats or scrim materials, the fibrous base sheet may be a fiberboard material and similar materials. It is also contemplated that the fungi resistant asphalt of the subject invention may be applied to other base sheet materials, such as polymeric films and various sheathing products, by coating one or both major surfaces of the other sheet materials with the fungi resistant asphalt. While polymeric film base sheets made of polymeric films able to withstand temperatures up to at least 150° C. (300° F.) for brief periods of time would be preferred, such as but not limited to polyester films and polycarbonate films (herein referred to "high temperature resistant polymeric films"), it is also contemplated that polymeric films that are not able to withstand such temperatures, such as but not limited to polyethylene films, might also be used for the base sheet (herein referred to as "low temperature resistant polymeric films").

The fibrous base sheets 12, 22 and 32 have a preferred Gurley Hill porosity of at least 20. The preferred porosity of the a fibrous base sheet facilitates the absorption by the fibrous base sheet of the fungi resistant asphalt applied to the first and/or the second major surfaces of the fibrous base sheet. By themselves, some of the fibrous base sheets may be too permeable to function as vapor retarders for many applications, such as but not limited to facing applications. However, by combining such fibrous base sheets with the fungi resistant asphalt, the permeance of the fungi resistant asphalt containing sheet material may be set so that fungi resistant asphalt containing sheet material functions as a vapor retarder to retard the transmission of water vapor through the fungi resistant asphalt containing sheet material to a desired degree. For example, the fungi resistant asphalt containing sheet material may be saturated and/or coated with the asphalt so that the sheet material (as measured in accordance with ASTM Test Designation: E 96-00 entitled "Standard Test Methods for Water Vapor Transmission of Materials") exhibits a water vapor permeance rating no greater than 1 and, more preferably, approximately 1 grain/ft$^2$/hour/inch Hg (no greater than 1 perm and more preferably, approximately 1 perm); a water vapor permeance rating between 1 and 10 grain/ft$^2$/hour/inch Hg (between 1 perm and 10 perms); or a water vapor permeance rating greater than 10 grain/ft$^2$/hour/inch Hg (greater than 10 perms) to provide a vapor retarder or barrier for a faced fibrous insulation blanket, e.g. a faced resilient fiberglass insulation blanket, and other insulation assemblies or systems.

The fungi resistant asphalt of the subject invention: has more fungi growth resistance than the asphalt has by itself without the fungi growth-inhibiting agent; preferably, is fungi growth resistant (as defined herein); and more preferably, is fungi growth resistant with no observable fungi growth (as defined herein). The fungi resistant asphalt containing sheet material of the subject invention: preferably, is fungi growth resistant (as defined herein); and more preferably, is fungi growth resistant with no observable fungi growth (as defined herein).

It should be noted that the fungi growth-inhibiting agent used in fungi resistant asphalt of the subject invention may comprise one fungi growth-inhibiting agent or a combination or blend of two or more fungi growth-inhibiting agents to provide a broader or more efficacious fungi growth resistance for the fungi resistant asphalt containing sheet material. To avoid the exposure of the fungi growth-inhibiting agent in the fungi resistant asphalt to high temperatures, the fungi resistant asphalt of the subject invention may be applied to the base sheet through the use of emulsified asphalt application techniques. However, for the hot asphalt application techniques commonly used in the industry, the fungi growth-inhibiting agent should be able to withstand temperatures in excess of 150° C. (300° F.) for long periods of time, e.g. periods of up to about 12 hours, and, preferably, temperatures in excess of 175° C. (350° F.) for periods up to 60 minutes without significant degradation (temperatures commonly encountered during the preparation and application of the fungi resistant asphalt to the fibrous base sheet when making the fungi resistant asphalt containing sheet material of the subject invention). The following are examples of fungi growth inhibiting agents that withstand the above temperatures for the specified times without significant degradation: 2-(4-Thiazolyl) Benzimidazole (a chemical also known as "TBZ") sold by Ciba Specialty Chemicals under the trade designation Iraguard F 3000; silver zeolyte sold by Rohm & Haas Company under the trade designation KATHON; and Zinc Pyrithione sold by Arch Chemicals Inc. under the trade designation Zinc Omadine.

In a preferred fungi resistant asphalt containing sheet material of the subject invention, the fungi resistant asphalt containing sheet material contains between 200 and 2000 ppm (parts per million), more preferably between 300 and 700 ppm, and most preferably between 400 and 600 ppm of the fungi growth-inhibiting agent 2-(4-Thiazolyl) Benzimidazole (a chemical also known as "TBZ"). In another preferred fungi resistant asphalt containing sheet material of the subject invention, the asphalt coating layer or layers each contain at least 2 grams of 2-(4-Thiazolyl) Benzimidazole ("TBZ") per each 92.9 square meters of coating. The fungi resistant asphalt is preferably applied to the fibrous base sheets in amounts ranging from about 0.03 to about 0.10 kilograms per square meter (about 6 to about 20 pounds per 1000 square feet).

The making of a sheet material that is fungi resistant by the inclusion of 2-(4-Thiazolyl) Benzimidazole ("TBZ") in the fungi resistant asphalt of an asphalt containing sheet material rather than incorporating the 2-(4-Thiazolyl) Benzimidazole ("TBZ") in an asphalt free sheet material (e.g. a kraft paper sheet) during the manufacture of the sheet material has proved to be very beneficial. When tested in accordance with ASTM Standard Test Method for Determining Fungi Resistance of Insulation Materials and Facings Designation: C1338-00, a fungi resistant asphalt containing sheet material using a particular kraft paper sheet with an asphalt coating layer containing about 2 grams of 2-(4-Thiazolyl) Benzimidazole ("TBZ") per each 1000 square feet of coating (about 2 grams of 2-(4-Thiazolyl) Benzimidazole ("TBZ") per each 92.9 square meters of coating) had a fungi growth resistance substantially equal to the fungi growth resistance of an asphalt free otherwise identical kraft paper sheet containing about 5 grams of 2-(4-Thiazolyl) Benzimidazole ("TBZ") per each 1000 square feet of kraft paper sheet (about 5 grams of 2-(4-Thiazolyl) Benzimidazole ("TBZ") per each 92.9 square meters of the kraft paper sheet). Thus, for similar efficacy against fungi growth, the inclusion of the 2-(4-Thiazolyl) Benzimidazole ("TBZ") in the asphalt of the asphalt containing sheet material rather than in the asphalt free sheet material resulted in about a 60% reduction in the usage of 2-(4-Thiazolyl) Benzimidazole ("TBZ").

Samples of the standard asphalt used by Johns Manville International to form the asphalt coating layers on facings of kraft faced building insulation were modified by adding quantities of TBZ and/or Zinc Pyrithione to the asphalt in parts per million (ppm). Five specimens of the asphalt with and without the TBZ and/or Zinc Pyrithione additives were then one-side coated on glass fiber filter paper (this type of filter paper does not support mold growth and is used as a noncontributing carrier for the asphalt). A sample of the number four specimen of asphalt was also one-side coated on regular 35 pound per 3000 square feet natural kraft paper to form specimen number 6. The variations shown in the table below were tested in triplicate for mold growth resistance in accordance with ASTM Test Designation G 21-96 (Reapproved 2002) entitled "Standard Practice for Determining Resistance of Synthetic Polymeric Materials to Fungi".

| Specimen | Specimen ID | TBZ ppm | Zinc ppm | Week 1 | Week 2 | Week 3 | Week 4 |
|---|---|---|---|---|---|---|---|
| 1 | Asphalt Coated Filter Paper | 0 | 0 | 0, 0, 1 | 2, 1, 3 | 3, 3, 4 | 4, 4, 4 |
| 2 | Asphalt Coated Filter Paper | 500 | 0 | 0, 0, 0 | 0, 0, 0 | 0, 0, 1 | 0, 0, 1 |
| 3 | Asphalt Coated Filter Paper | 0 | 600 | 2, 2, 2 | 2, 3, 3 | 3, 3, 4 | 3, 4, 4 |
| 4 | Asphalt Coated Filter Paper | 500 | 600 | 0, 0, 0 | 0, 0, 0 | 0, 0, 0 | 0, 0, 0 |

-continued

| Specimen | Specimen ID | TBZ ppm | Zinc ppm | Week 1 | Week 2 | Week 3 | Week 4 |
|---|---|---|---|---|---|---|---|
| 5 | Asphalt Coated Filter Paper | 250 | 300 | 0, 0, 0 | 0, 0, 0 | 0, 0, 0 | 0, 0, 0 |
| 6 | Asphalt Coated Kraft Paper | 500 | 600 | 1, 1, 1 | 2, 2, 2 | 3, 3, 3 | 3, 3, 4 |

ASTM Test Designation G-21 has the following ratings for observed fungi growth on specimens (Sporulating or Non-Sporulating, or Both):

| | Rating |
|---|---|
| None | 0 |
| Traces of Growth (less than 10% coverage) | 1 |
| Light Growth (10% to 30% coverage) | 2 |
| Medium Growth (30% to 60% coverage) | 3 |
| Heavy Growth (60% to complete coverage) | 4 |

The results indicate the following:

1. The asphalt with no fungi growth-inhibiting additives supports fungi growth and is not very fungi resistant.
2. TBZ added to the asphalt makes the asphalt dramatically more fungi resistant.
3. Zinc Pyrithione added to the asphalt at the 600 ppm level does not provide a measurable fungi resistance benefit.
4. TBZ used in combination with Zinc Pyrithione makes the asphalt dramatically more fungi resistant even at relatively low addition levels. The results suggest a synergistic benefit from the blend of these two fungi growth inhibiting agents.

The results suggest the following:

1. Asphalt without a fungi growth-inhibiting agent applied to naturally fungi resistant fibrous base sheets like polyester spunbond or a nonwoven glass mat will result in a composite product that is no longer fungi resistant because the untreated asphalt will support fungi growth.
2. Applying a fungi resistant asphalt to one major surface of fibrous base sheets like natural kraft paper, organic roofing felts or other sheet materials that readily support fungi growth, will provide some added fungi growth resistance. However, unless such fibrous base sheets are saturated with the fungi resistant asphalt, the uncoated major surface of the fibrous base sheet will continue to provide food for fungi and support some amount of fungi growth.
3. Applying a fungi resistant asphalt to both major surfaces of fibrous base sheets like natural kraft paper, organic roofing felts or other sheet materials that readily support fungi growth, will produce a composite product that is significantly fungi resistant and with proper design, a composite product with a no growth rating per the stringent ASTM Test Designation G-21 referenced above.

The fungi resistant asphalt of the subject invention may contain an odor-reducing additive in an amount sufficient to significantly reduce and substantially neutralize the asphalt odor that would otherwise be emitted by the asphalt without adversely affecting the desirable qualities of the asphalt. For example the fungi resistant asphalt of the subject invention may include an odor-reducing additive of essential plant oil in an amount approximating 1 part by weight odor-reducing additive to 10,000 parts by weight asphalt.

Preferably, each fungi resistant asphalt and each fungi resistant asphalt containing sheet material of the subject invention passes the ASTM Test Designation C 1338-00, entitled "Standard Test Method for Determining Fungi Resistance of Insulation Materials and Facings", published August 2000, by ASTM International of West Conshohocken, Pa. (referred in this specification and claims as "ASTM Test Designation C 1338-00"). As used in this specification and claims the term "fungi growth resistant" means the observable spore growth at 40× magnification on the surface of an asphalt or an asphalt containing sheet material being tested is less than the observable spore growth at 40× magnification on either a white birch or southern yellow pine comparative specimen when the specimens are tested in accordance with ASTM Test Designation C 1338-00. As used in this specification and claims the term "fungi growth resistant with no observable fungi growth" means there is no observable spore growth at 40× magnification on the surface of an asphalt or asphalt containing sheet material specimen being tested when the specimens are tested in accordance with ASTM Test Designation C 1338-00. More preferably, each fungi resistant asphalt and each fungi resistant asphalt containing sheet material of the subject invention is fungus resistant (as defined in section 11.2 of the test) as tested by ASTM test designation D 2020-92 (Reapproved 1999), entitled "Standard Test Methods for Mildew (Fungus) Resistance of Paper and Paperboard", published Aug. 1992, by ASTM International of West Conshohocken, Pa. (referred in this specification and claims as "ASTM Test Designation D 2020-92"). Most preferably, each fungi resistant asphalt and each fungi resistant asphalt containing sheet material of the subject invention has a rating of 1 or less (0 or 1 as defined in section 9.3 of the test) as tested by ASTM test Designation G 21-96 (Reapproved 2002), entitled "Standard Practice for Determining Resistance of Synthetic Polymeric Materials to Fungi", published Sep. 1996, by ASTM International of West Conshohocken, Pa. (referred in this specification and claims as "ASTM Test Designation G 21-96"). The text of ASTM Test Designations C 1338-00, D 2020-92, and G 21-96 referred to in this paragraph are hereby incorporated into this specification in their entirety by reference.

The fungi resistant asphalt may be applied to the fibrous base sheet to form the fungi resistant asphalt containing sheet material by different methods including the hot asphalt application techniques commonly used in the industry. For example, the asphalt of the asphalt containing sheet materials 10, 20 and 30 of the subject invention may be applied to one or both major surfaces of the fibrous base sheet with slot die extrusion coaters; applied to one or both major surfaces of the fibrous base sheet from a reservoir of asphalt with transfer rolls; applied to both major surfaces of the fibrous base sheet by dipping the base sheet into the asphalt, and applied to one or both major surfaces of the fibrous base sheet by conventional spray on techniques. The asphalt is normally applied to the fibrous base sheet with the asphalt heated to temperatures in excess of 120° C. (250° F.) and typically, with the asphalt heated to temperatures in excess of 150° C. (300° F.). At these temperatures, the asphalt is readily absorbed into the fibrous base sheet by a wicking or capillary action without degrading the fibrous base sheet and for fibrous base sheets that normally support fungi growth, the fungi growth-inhibiting agent in the asphalt can increase the fungi growth resistance of the fibrous base sheet throughout the fibrous base sheet including the uncoated second major surface of the fibrous base sheet.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A fungi resistant, asphalt containing, roofing sheet material, comprising:
   a fibrous base sheet having a first major surface and a second major surface; the fibrous base sheet being a nonwoven spunbond or glass fiber mat;
   a first fungi resistant asphalt layer applied at an elevated temperature on the first major surface of the fibrous base sheet that is partially absorbed into the fibrous base sheet and allowed to cool and harden; the first fungi resistant asphalt layer containing a blend of two or more fungi growth-inhibiting agents comprising 2-(4-Thiazolyl) Benzimidazole and Zinc Pyrithione, which can withstand temperatures in excess of 150° C. for periods of up to about 12 hours without significant degradation, in amounts that result in the first fungi resistant asphalt layer having more fungi growth resistance than without the fungi growth-inhibiting agent and an odor-reducing additive in an amount sufficient to substantially eliminate odor that would otherwise be emitted by the first fungi resistant asphalt layer; and
   the fibrous base sheet having a Gurley Hill porosity of at least 20 to facilitate the partial absorption by the fibrous base sheet of the first fungi resistant asphalt layer and the fungi resistant, asphalt containing, roofing sheet material having a water vapor permeance no greater than 1.

2. The fungi resistant, asphalt containing, roofing sheet material according to claim 1, wherein:
   the second major surface of the fibrous base sheet is essentially asphalt free.

3. The fungi resistant, asphalt containing, roofing sheet material according to claim 1, wherein:
   the fibrous base sheet is saturated with asphalt from the first fungi resistant asphalt layer.

4. The fungi resistant, asphalt containing, roofing sheet material according to claim 1, including:
   a second fungi resistant asphalt layer on the second major surface of the fibrous base sheet that is partially absorbed into the fibrous base sheet; the second fungi resistant asphalt layer containing a blend of two or more fungi growth-inhibiting agents therein comprising 2-(4-Thiazolyl) Benzimidazole and Zinc Pyrithione, which can withstand temperatures in excess of 150° C. for periods of up to about 12 hours without significant degradation, in amounts that result in the second fungi resistant asphalt layer having more fungi growth resistance than without the fungi growth-inhibiting agent and an odor-reducing additive in an amount sufficient to substantially eliminate odor that would otherwise be emitted by the second fungi resistant asphalt layer.

5. The fungi resistant, asphalt containing, roofing sheet material according to claim 4, wherein:
   the fibrous base sheet is saturated with asphalt from the first and second fungi resistant asphalt layers.

6. A fungi resistant, asphalt containing, roofing sheet material, comprising:
   a polymeric film base sheet having a first major surface and a second major surface; the polymeric film base is able to withstand temperatures up to at least 150° C.;
   a first fungi resistant, asphalt layer applied at an elevated temperature on the first major surface of the polymeric film base sheet; the first fungi resistant asphalt layer containing a blend of two or more fungi growth-inhibiting agents comprising 2-(4-Thiazolyl) Benzimidazole and Zinc Pyrithione, which can withstand temperatures in excess of 150° C. for periods of up to about 12 hours without significant degradation, in amounts that result in the first fungi resistant asphalt layer having more fungi growth resistance than the first fungi resistant asphalt layer without the fungi growth-inhibiting agent and an odor-reducing additive in an amount sufficient to substantially eliminate odor that would otherwise be emitted by the first fungi resistant asphalt layer; and
   the polymeric film base sheet having a Gurley Hill porosity of at least 20 to facilitate the partial absorption by the polymeric film base sheet of the first fungi resistant asphalt layer with the first fungi resistant asphalt layer being partially absorbed into the polymeric film base sheet and allowed to cool and harden and the fungi resistant, asphalt containing, roofing sheet material having a water vapor permeance no greater than 1.

7. The fungi resistant, asphalt containing, roofing sheet material according to claim 6, wherein:
   the polymeric film base is polyester or a polycarbonate film.

8. The fungi resistant, asphalt containing, roofing sheet material according to claim 6, including:
   a second fungi resistant asphalt layer on the second major surface of the polymeric film base sheet; the second fungi resistant asphalt layer containing a blend of two or more fungi growth-inhibiting agents comprising 2-(4-Thiazolyl) Benzimidazole and Zinc Pyrithione, which can withstand temperatures in excess of 150° C. for periods of up to about 12 hours without significant degradation, in amounts that result in the second fungi resistant asphalt layer having more fungi growth resistance than the second fungi resistant asphalt layer without the fungi growth-inhibiting agent and an odor-reducing additive in an amount sufficient to substantially eliminate odor that would otherwise be emitted by the first fungi resistant asphalt layer.

9. The fungi resistant, asphalt containing, roofing sheet material according to claim 8, wherein:
the second fungi resistant asphalt layer is partially absorbed into the polymeric film base sheet.

10. The fungi resistant, asphalt containing, roofing sheet material according to claim 8, wherein:
the polymeric film base is polyester or polycarbonate film.

11. The fungi resistant, asphalt containing, roofing sheet material of claim 1, wherein the fungi-resistant asphalt layer contains less than one percent by weight-odor reducing additive.

12. The fungi resistant, asphalt containing, roofing sheet material of claim 1, wherein the fungi-resistant asphalt layer includes odor-reducing additive in an amount approximating 1 part by weight odor-reducing additive to 10,000 parts by weight asphalt.

13. The fungi resistant, asphalt containing, roofing sheet material of claim 6, wherein the fungi-resistant asphalt layer contains less than one percent by weight-odor reducing additive.

14. The fungi resistant, asphalt containing, roofing sheet material of claim 6, wherein the fungi-resistant asphalt layer includes odor-reducing additive in an amount approximating 1 part by weight odor-reducing additive to 10,000 parts by weight asphalt.

* * * * *